United States Patent
Suto et al.

(10) Patent No.: US 10,210,894 B1
(45) Date of Patent: Feb. 19, 2019

(54) MAGNETIC RECORDING MEDIUM INCLUDING MULTIPLE MAGNETIC LAYERS WITH MULTIPLE REGIONS HAVING ALIGNED EASY MAGNETIZATION AXES AND MAGNETIC RECORDING AND REPRODUCING DEVICE

(71) Applicant: Kabushiki Kaisha Toshiba, Tokyo (JP)

(72) Inventors: Hirofumi Suto, Kawasaki Kanagawa (JP); Taro Kanao, Kawasaki Kanagawa (JP); Tazumi Nagasawa, Yokohama Kanagawa (JP); Rie Sato, Yokohama Kanagawa (JP); Koichi Mizushima, Kamakura Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/897,186

(22) Filed: Feb. 15, 2018

(30) Foreign Application Priority Data

Sep. 19, 2017 (JP) .................................. 2017-179462

(51) Int. Cl.
| | |
|---|---|
| *G11B 5/012* | (2006.01) |
| *G11B 5/716* | (2006.01) |
| *G11B 5/66* | (2006.01) |
| *G11B 5/82* | (2006.01) |

(52) U.S. Cl.
CPC ................ *G11B 5/66* (2013.01); *G11B 5/012* (2013.01); *G11B 5/716* (2013.01); *G11B 5/82* (2013.01)

(58) Field of Classification Search
CPC ............ G11B 5/012; G11B 5/716; G11B 5/82
USPC .......................................................... 360/135
See application file for complete search history.

(56) References Cited

U.S. PATENT DOCUMENTS

| | | | | |
|---|---|---|---|---|
| 9,047,906 | B2 * | 6/2015 | Fan ........................ | G11B 5/66 |
| 9,324,353 | B2 * | 4/2016 | Hellwig .................. | G11B 5/66 |
| 9,558,777 | B2 * | 1/2017 | Hellwig .................. | G11B 5/66 |
| 9,601,145 | B1 * | 3/2017 | Grobis ..................... | G11B 5/66 |
| 9,697,857 | B1 * | 7/2017 | Ahner ...................... | G11B 5/66 |

(Continued)

FOREIGN PATENT DOCUMENTS

| | | |
|---|---|---|
| JP | 2009-110641 | 5/2009 |
| JP | 2010-97681 | 4/2010 |

(Continued)

*Primary Examiner* — Jefferson Evans
(74) *Attorney, Agent, or Firm* — Finnegan, Henderson, Farabow, Garrett & Dunner, L.L.P.

(57) ABSTRACT

According to one embodiment, a magnetic recording medium includes a first layer and a second layer. The first layer includes a first magnetic region, a second magnetic region, and a nonmagnetic region provided between the first and second magnetic regions. A direction from the second magnetic region toward the first magnetic region is along a first direction. The second layer includes third, fourth, and fifth magnetic regions. At least a portion of the fifth magnetic region is provided between the third and fourth magnetic regions. The third magnetic region overlaps the first magnetic region in a second direction crossing the first direction. The fourth magnetic region overlaps the second magnetic region in the second direction. The fifth magnetic region overlaps the nonmagnetic region in the second direction. An easy magnetization axis of each of the first to fifth magnetic regions is aligned with the second direction.

14 Claims, 9 Drawing Sheets

(56) References Cited

U.S. PATENT DOCUMENTS

| | | | |
|---|---|---|---|
| 9,990,951 B2* | 6/2018 | Lu | G11B 5/855 |
| 2007/0231609 A1* | 10/2007 | Ajan | G11B 5/66 |
| | | | 428/828.1 |
| 2008/0090104 A1* | 4/2008 | Sonobe | B82Y 10/00 |
| | | | 428/800 |
| 2008/0261078 A1* | 10/2008 | Berger | G11B 5/02 |
| | | | 428/800 |
| 2010/0075178 A1* | 3/2010 | Jubert | B82Y 10/00 |
| | | | 428/800 |
| 2010/0323220 A1 | 12/2010 | Onoue | |
| 2011/0097604 A1 | 4/2011 | Onoue | |
| 2011/0223446 A1* | 9/2011 | Onoue | G11B 5/65 |
| | | | 428/839.2 |
| 2012/0251845 A1* | 10/2012 | Wang | G11B 5/66 |
| | | | 428/827 |
| 2015/0262602 A1 | 9/2015 | Onoue et al. | |
| 2016/0118071 A1* | 4/2016 | Hirotsune | G11B 5/65 |
| | | | 360/75 |
| 2017/0061999 A1* | 3/2017 | Suto | G11B 5/64 |
| 2017/0256273 A1* | 9/2017 | Suto | G11B 5/012 |

FOREIGN PATENT DOCUMENTS

| | | |
|---|---|---|
| JP | 2011-34603 | 2/2011 |
| JP | 2017-45494 | 3/2017 |

* cited by examiner

MAGNETIC RECORDING MEDIUM INCLUDING MULTIPLE MAGNETIC LAYERS WITH MULTIPLE REGIONS HAVING ALIGNED EASY MAGNETIZATION AXES AND MAGNETIC RECORDING AND REPRODUCING DEVICE

CROSS-REFERENCE TO RELATED APPLICATIONS

This application is based upon and claims the benefit of priority from Japanese Patent Application No. 2017-179462, filed on Sep. 19, 2017; the entire contents of which are incorporated herein by reference.

FIELD

Embodiments described herein relate generally to a magnetic recording medium and a magnetic recording and reproducing device.

BACKGROUND

There is a magnetic recording and reproducing device that uses a magnetic recording medium such as a magnetic disk, etc. It is desirable to increase the recording density of the magnetic recording medium.

DETAILED DESCRIPTION

Figure 1A:
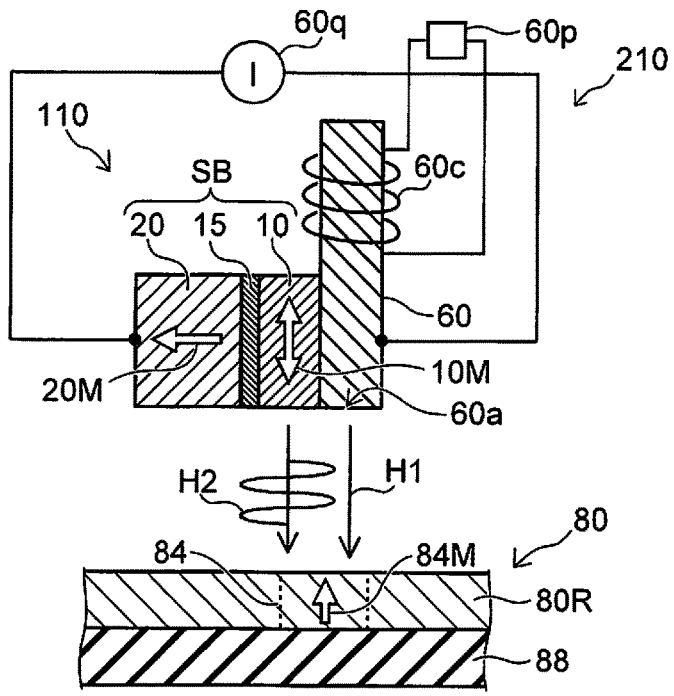
FIGS. 1A to 1C are schematic cross-sectional views illustrating a magnetic recording medium and a magnetic recording and reproducing device according to a first embodiment.

According to one embodiment, a magnetic recording medium includes a first layer and a second layer. The first layer includes a first magnetic region, a second magnetic region, and a nonmagnetic region provided between the first magnetic region and the second magnetic region. A direction from the second magnetic region toward the first magnetic region is along a first direction. The second layer includes a third magnetic region, a fourth magnetic region, and a fifth magnetic region. At least a portion of the fifth magnetic region is provided between the third magnetic region and the fourth magnetic region. The third magnetic region overlaps the first magnetic region in a second direction crossing the first direction. The fourth magnetic region overlaps the second magnetic region in the second direction. The fifth magnetic region overlaps the nonmagnetic region in the second direction. An easy magnetization axis of each of the first to fifth magnetic regions is aligned with the second direction. An orientation of a third magnetization of the third magnetic region has a reverse component of an orientation of a first magnetization of the first magnetic region. An orientation of a fourth magnetization of the fourth magnetic region has a reverse component of an orientation of a second magnetization of the second magnetic region. A magnetic anisotropy energy of the third magnetic region is smaller than a magnetic anisotropy energy of the first magnetic region. A magnetic anisotropy energy of the fourth magnetic region is smaller than a magnetic anisotropy energy of the second magnetic region.

According to another embodiment, a magnetic recording medium includes a first layer and a second layer. The first layer includes a first magnetic region, a second magnetic region, and a nonmagnetic region provided between the first magnetic region and the second magnetic region. A direction from the second magnetic region toward the first magnetic region is along a first direction. The second layer includes a third magnetic region, a fourth magnetic region, and a fifth magnetic region. The third magnetic region overlaps the first magnetic region in a second direction crossing the first direction. The fourth magnetic region overlaps the second magnetic region in the second direction. The fifth magnetic region overlaps the nonmagnetic region in the second direction. The third magnetic region is positioned between the first magnetic region and a portion of the fifth magnetic region in the second direction. The fourth magnetic region is positioned between the second magnetic region and another portion of the fifth magnetic region in the second direction. An easy magnetization axis of each of the first to fifth magnetic regions is aligned with the second direction. An orientation of a third magnetization of the third magnetic region has a reverse component of an orientation of a first magnetization of the first magnetic region. An orientation of a fourth magnetization of the fourth magnetic region has a reverse component of an orientation of a second magnetization of the second magnetic region. A magnetic anisotropy energy of the third magnetic region is smaller than a magnetic anisotropy energy of the first magnetic region. A magnetic anisotropy energy of the fourth magnetic region is smaller than a magnetic anisotropy energy of the second magnetic region.

According to another embodiment, a magnetic recording and reproducing device includes the magnetic recording medium described in one of the above, and a magnetic head. The magnetic head includes a magnetic pole and an alternating magnetic field generator. The first magnetization of the first magnetic region oscillates when an alternating magnetic field generated from the alternating magnetic field generator is applied to the first magnetic region.

Various embodiments will be described hereinafter with reference to the accompanying drawings.

The drawings are schematic and conceptual; and the relationships between the thickness and width of portions, the proportions of sizes among portions, etc., are not necessarily the same as the actual values thereof. Further, the dimensions and proportions may be illustrated differently among drawings, even for identical portions.

In the specification and drawings, components similar to those described or illustrated in a drawing thereinabove are marked with like reference numerals, and a detailed description is omitted as appropriate.

First Embodiment

Figure 1B:
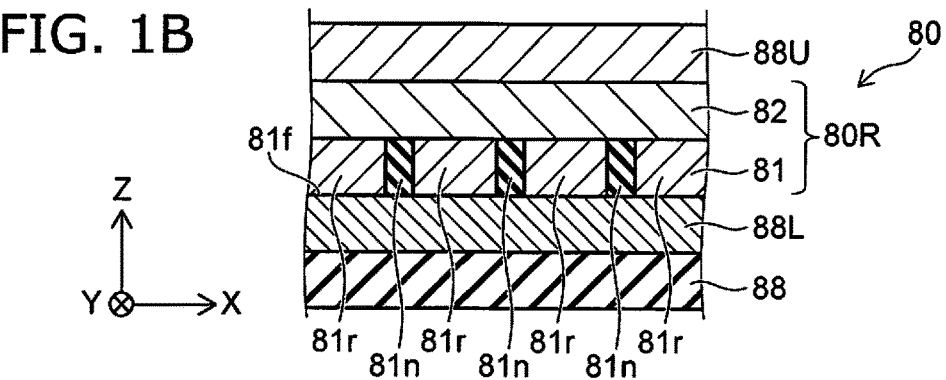
Figure 1C:
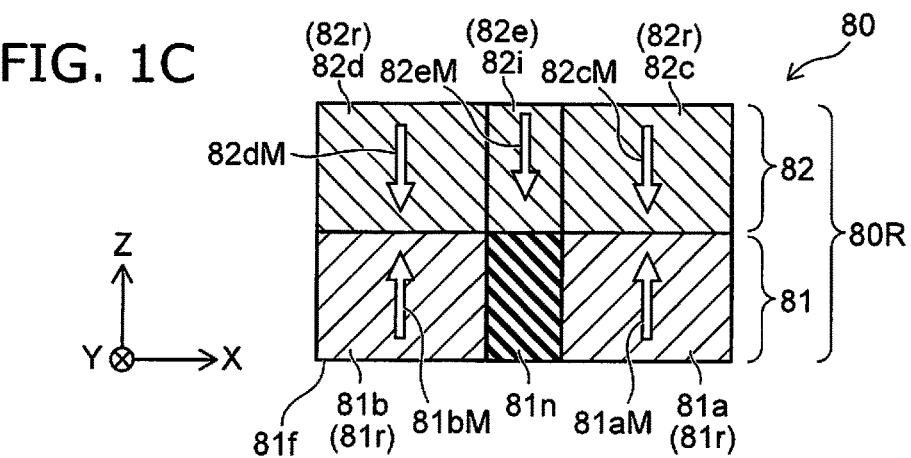

FIGS. 1A to 1C are schematic cross-sectional views illustrating a magnetic recording medium and a magnetic recording and reproducing device according to the first embodiment.

FIG. 1A is a schematic view of the magnetic recording and reproducing device. FIG. 1B is a schematic view of the magnetic recording medium. FIG. 1C is a schematic view of a portion of the magnetic recording medium.

As shown in FIG. 1A, the magnetic recording and reproducing device 210 includes a magnetic recording medium 80 and a magnetic head 110. The magnetic head 110 has a medium-opposing surface 60a (e.g., an ABS (Air Bearing Surface)). The medium-opposing surface 60a opposes the magnetic recording medium 80.

The magnetic recording medium 80 includes, for example, a base body 88 and a recording layer 80R. The recording layer 80R is positioned between the base body 88 and the magnetic head 110.

A region 84 (e.g., a recording bit) of a portion of the magnetic recording medium 80 opposes the magnetic head 110. A magnetization 84M of the region 84 is controlled by the magnetic head 110.

The magnetic head 110 includes a magnetic pole 60 (a major electrode) and an alternating magnetic field generator SB. A coil 60c is provided around a portion of the magnetic pole 60. The coil 60c is electrically connected to a recording signal circuit 60p. For example, a recording current (a recording signal) is supplied from the recording signal circuit 60p to the coil 60c; and a recording magnetic field H1 is generated from the magnetic pole 60. The recording magnetic field H1 is applied to a region (the region 84) of a portion of the magnetic recording medium 80. The orientation of the recording magnetic field H1 changes according to the polarity of the recording signal. The orientation of the magnetization 84M of the region (the region 84) of the portion of the magnetic recording medium 80 is changed by the recording magnetic field H1.

The magnetic recording medium 80 is, for example, a perpendicular magnetic recording medium. The orientation of the magnetization 84M is, for example, "upward" or "downward." The orientation of the magnetization 84M corresponds to the information to be recorded.

The alternating magnetic field generator SB includes, for example, a first magnetic layer 10, a second magnetic layer 20, and a nonmagnetic layer 15. In the example, the first magnetic layer 10 is positioned between the second magnetic layer 20 and a portion of the magnetic pole 60. The nonmagnetic layer 15 is positioned between the first magnetic layer 10 and the second magnetic layer 20. For example, a magnetization 10M of the first magnetic layer 10 crosses the stacking direction of the alternating magnetic field generator SB (e.g., the direction from the first magnetic layer 10 toward the second magnetic layer 20). The first magnetic layer 10 is, for example, an in-plane magnetization film. A magnetization 20M of the second magnetic layer 20 is aligned with the stacking direction. The second magnetic layer 20 is, for example, a perpendicular magnetization film. The alternating magnetic field generator SB is electrically connected to a current supply circuit 60q. In the example, a current that is supplied from the current supply circuit 60q is supplied to the alternating magnetic field generator SB via the magnetic pole 60. The current flows in the alternating magnetic field generator SB; and the recording magnetic field H1 recited above is applied to the alternating magnetic field generator SB. Thereby, an alternating magnetic field H2 (a high frequency magnetic field) is generated from the alternating magnetic field generator SB. For example, the first magnetic layer 10 is an oscillation generation layer. The second magnetic layer 20 is a spin injection layer. The alternating magnetic field generator SB is, for example, a spin torque oscillator. In the embodiment, the configuration of the alternating magnetic field generator SB is arbitrary. An oscillator circuit or the like may be used as the alternating magnetic field generator SB.

The alternating magnetic field H2 is applied, with the recording magnetic field H1 recited above, to one region 84 of the magnetic recording medium 80. Ferromagnetic resonance with the alternating magnetic field H2 occurs in this region 84 of the magnetic recording medium 80. Thereby, the magnetization 84M of this region 84 of the magnetic recording medium 80 oscillates (precesses). Thereby, the magnetization of this region 84 of the magnetic recording medium 80 changes easily. By applying the recording magnetic field H1 to the region 84 in this state, the magnetization 84M of this region 84 is easily controlled according to the recording magnetic field H1. The recording operation stabilizes. Microwave assisted recording is performed.

The magnetic recording medium 80 and the magnetic head 110 move relative to each other. With this movement, the relative position of the region 84 with respect to the magnetic head 110 moves. With this movement, the application of the alternating magnetic field H2 to the region 84 ends. The oscillation of the magnetization 84M of this region 84 ends; and the magnetization of this region 84 no longer changes easily. The magnetization (the information) is stably retained.

As shown in FIG. 1B, the magnetic recording medium 80 according to the embodiment includes a first layer 81 and a second layer 82. The first layer 81 and the second layer 82 are included in the recording layer 80R. The base body 88, a lower layer 88L, and an upper layer 88U are further provided in the example. In the example, the first layer 81 is positioned between the base body 88 and the second layer 82. The second layer 82 may be positioned between the base body 88 and the first layer 81.

In the example, the first layer 81 is positioned between the base body 88 and the upper layer 88U. The second layer 82 is positioned between the first layer 81 and the upper layer 88U. The lower layer 88L is positioned between the base body 88 and the first layer 81.

The base body 88 is, for example, a substrate. The lower layer 88L is, for example, a foundation layer. The upper layer 88U is, for example, a protective layer. Examples of the base body 88, the lower layer 88L, and the upper layer 88U are described below.

The first layer 81 includes multiple magnetic regions 81r and a nonmagnetic region 81n. The multiple magnetic regions 81r are, for example, grains of the crystal. The multiple magnetic regions 81r include, for example, a CoCr-based alloy, etc. Examples of the material of the multiple magnetic regions 81r are described below.

The nonmagnetic region 81n is positioned between the multiple magnetic regions 81r. The nonmagnetic region 81n includes, for example, silicon oxide, etc. Examples of the material of the nonmagnetic region are described below. For example, the nonmagnetic region 81n corresponds to a grain boundary portion. For example, the first layer 81 has a granular structure. For example, one, two, or more magnetic regions 81r are included in one bit (region 84).

The direction from one of the multiple magnetic regions 81r toward another one of the multiple magnetic regions 81r is taken as a first direction.

The first direction is taken as an X-axis direction. One direction perpendicular to the X-axis direction is taken as a Z-axis direction. A direction perpendicular to the X-axis direction and the Z-axis direction is taken as a Y-axis direction.

For example, the magnetic recording medium 80 spreads along the X-Y plane. For example, the magnetic recording medium 80 is substantially parallel to the X-Y plane. For example, the first layer 81 has a first surface 81f. The first surface 81f is substantially parallel to the X-Y plane. The multiple magnetic regions 81r are arranged two-dimensionally along the first surface 81f.

The direction from the first layer 81 toward the second layer 82 is aligned with the Z-axis direction. As illustrated in FIG. 1A, the magnetic head 110 opposes the magnetic recording medium 80 along the Z-axis direction.

The second layer 82 includes, for example, at least one selected from the group consisting of a CoCr-based alloy, an FePt-based alloy, a CoPt-based alloy, a Co/Pt stacked film, a Co/Pt stacked film, and a RE-TM alloy (rare earth-iron group alloy).

FIG. 1C illustrates an enlarged portion of FIG. 1B. The first layer 81 includes a first magnetic region 81a, a second magnetic region 81b, and the nonmagnetic region 81n. The first magnetic region 81a is one of the multiple magnetic regions 81r. The second magnetic region 81b is another one of the multiple magnetic regions 81r. A direction from the second magnetic region 81b toward the first magnetic region 81a is along the first direction. The second magnetic region 81b is separated from the first magnetic region 81a in the first direction. The nonmagnetic region 81n is positioned between the first magnetic region 81a and the second magnetic region 81b.

In the example, the first direction is taken as the X-axis direction.

In the example, the second layer 82 includes a third magnetic region 82c, a fourth magnetic region 82d, and a fifth magnetic region 82e. The fifth magnetic region 82e is provided between the third magnetic region 82c and the fourth magnetic region 82d. As described below, at least a portion of the fifth magnetic region 82e may be provided between the third magnetic region 82c and the fourth magnetic region 82d. In the example, the fifth magnetic region 82e corresponds to an intermediate region 82i between the third magnetic region 82c and the fourth magnetic region 82d. The fifth magnetic region 82e may be continuous with at least one of the third magnetic region 82c or the fourth magnetic region 82d. The boundary between the fifth magnetic region 82e and the third magnetic region 82c and the boundary between the fifth magnetic region 82e and the fourth magnetic region 82d may be distinct or may be indistinct.

One direction crossing the first direction is taken as a second direction. The second direction is, for example, the Z-axis direction.

The third magnetic region 82c overlaps the first magnetic region 81a in the second direction (the Z-axis direction). The fourth magnetic region 82d overlaps the second magnetic region 81b in the second direction. The fifth magnetic region 82e overlaps the nonmagnetic region 81n in the second direction. The direction from the first magnetic region 81a toward the third magnetic region 82c is aligned with the second direction. The direction from the second magnetic region 81b toward the fourth magnetic region 82d is aligned with the second direction. The direction from the nonmagnetic region 81n toward the fifth magnetic region 82e is aligned with the second direction.

The easy magnetization axis of the first magnetic region 81a (e.g., the direction of a first magnetization 81aM) is aligned with the second direction (the Z-axis direction). The easy magnetization axis of the second magnetic region 81b (e.g., the direction of a second magnetization 81bM) is aligned with the second direction. The easy magnetization axis of the third magnetic region 82c (e.g., the direction of a third magnetization 82cM) is aligned with the second direction. The easy magnetization axis of the fourth magnetic region 82d (e.g., the direction of a fourth magnetization 82dM) is aligned with the second direction. The easy magnetization axis of the fifth magnetic region 82e (e.g., the direction of a fifth magnetization 82eM) is aligned with the second direction.

For example, the angle between the Z-axis direction and one of these easy magnetization axes (the directions of the magnetizations) is less than 45 degrees. As described below, there is a state in which the magnetization oscillates for each of these magnetic regions. For example, as described above, the magnetization oscillates in a portion of the magnetic recording medium 80 when the alternating magnetic field H2 from the magnetic head 110 is applied to the portion of the magnetic recording medium 80. At such a time, the direction of the magnetization may not be along the second direction (the Z-axis direction). For example, the description relating to the easy magnetization axis recited above corresponds to the direction of the magnetization when such an alternating magnetic field H2 is not applied to the magnetic recording medium 80.

Thus, the first layer 81 and the second layer 82 are perpendicular magnetization films.

In the embodiment, the orientation of the third magnetization 82cM of the third magnetic region 82c has a reverse component of the orientation of the first magnetization 81aM of the first magnetic region 81a. The orientation of the fourth magnetization 82dM of the fourth magnetic region 82d has a reverse component of the orientation of the second magnetization 81bM of the second magnetic region 81b. For example, the orientation of the third magnetization 82cM of the third magnetic region 82c is the reverse of the orientation of the first magnetization 81aM of the first magnetic region 81a. For example, the orientation of the fourth magnetization 82dM of the fourth magnetic region 82d is the reverse of the orientation of the second magnetization 81bM of the second magnetic region 81b.

The magnetic anisotropy energy of the third magnetic region 82c is smaller than the magnetic anisotropy energy of the first magnetic region 81a. The magnetic anisotropy energy of the fourth magnetic region 82d is smaller than the magnetic anisotropy energy of the second magnetic region 81b.

For example, the fifth magnetic region 82e is magnetically coupled to the third magnetic region 82c and the fourth magnetic region 82d.

In the embodiment, the multiple magnetic regions 81r of the first layer 81 correspond to recording regions. For example, the second layer 82 stabilizes the magnetizations of the multiple magnetic regions 81r of the first layer 81.

In such a magnetic recording medium 80, the magnetizations of the first layer 81 can be controlled with good controllability. For example, stable recording is possible. Thereby, the recording density can be increased.

First, an example of the states of the magnetizations of the magnetic recording medium 80 will be described.

The fifth magnetic region 82e has magnetic anisotropy in the substantially perpendicular direction. The fifth magnetic region 82e is magnetically coupled to the third magnetic region 82c and the fourth magnetic region 82d. The fifth magnetic region 82e includes a portion contacting (or a portion proximal to) the third magnetic region 82c. The fifth magnetization 82eM of the fifth magnetic region 82e is magnetically coupled to the third magnetization 82cM of the third magnetic region 82c at this portion. Similarly, the fifth magnetic region 82e includes a portion contacting (or a portion proximal to) the fourth magnetic region 82d. The fifth magnetization 82eM of the fifth magnetic region 82e is magnetically coupled to the fourth magnetization 82dM of the fourth magnetic region 82d at this portion.

In one state as shown in FIG. 1C, the orientation of the third magnetization 82cM of the third magnetic region 82c is the same as the orientation of the fourth magnetization 82dM of the fourth magnetic region 82d. In such a case, a domain wall does not occur in the fifth magnetic region 82e.

Figure 2:
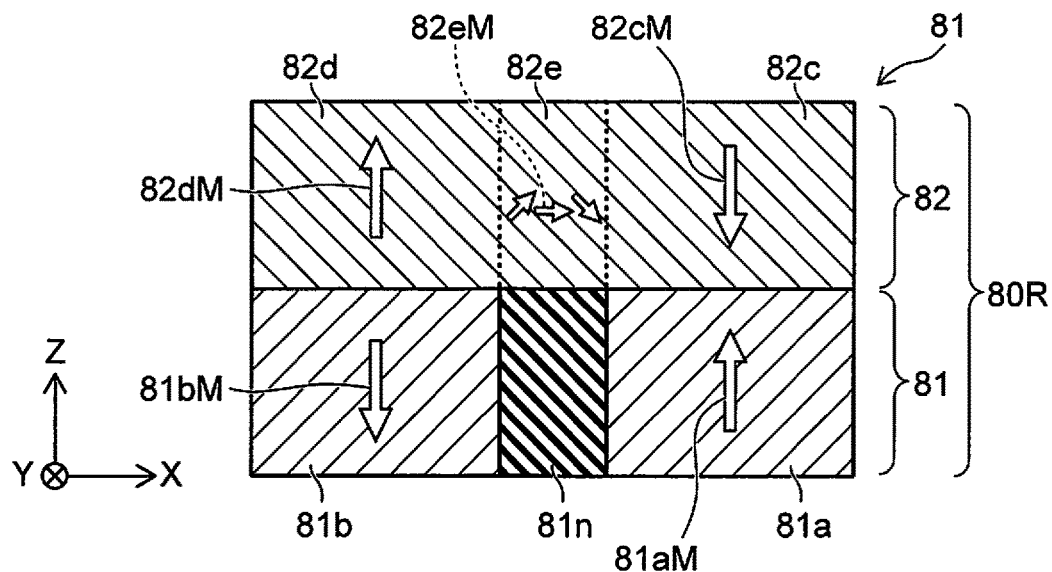
FIG. 2 is a schematic cross-sectional view illustrating one state of the magnetic recording medium according to the first embodiment.

FIG. 2 is a schematic cross-sectional view illustrating one state of the magnetic recording medium according to the first embodiment.

FIG. 2 illustrates another one state of the magnetic recording medium 80. As shown in FIG. 2, the orientation of the third magnetization 82cM of the third magnetic region 82c is the reverse of the orientation of the fourth magnetization 82dM of the fourth magnetic region 82d. In such a case, domain walls occur in the fifth magnetic region 82e. The energy of the fifth magnetic region 82e in the state illustrated in FIG. 2 is higher than the energy of the fifth magnetic region 82e in the state illustrated in FIG. 1C. Therefore, the orientations of the magnetizations in the two mutually-adjacent magnetic regions (the third magnetic region 82c and the fourth magnetic region 82d) are biased by the fifth magnetic region 82e toward becoming the same.

In one region 84 (recording bit), the information is recorded by the magnetic head 110 causing the magnetization direction of the multiple grains to be "upward" or "downward." At this time, by the action of the fifth magnetic region 82e, the magnetizations of the adjacent bits are biased toward being in the same direction. Thereby, the stochastically-occurring reversal of the magnetization of one grain of the multiple grains having the same orientation included in one region 84 (recording bit) due to a disturbance due to heat is suppressed. Thereby, for example, the thermal stability of the recorded information can be improved.

An example of the recording operation of the magnetic recording medium 80 will now be described. Microwave assisted recording is performed in the recording operation recited below.

Figure 3:
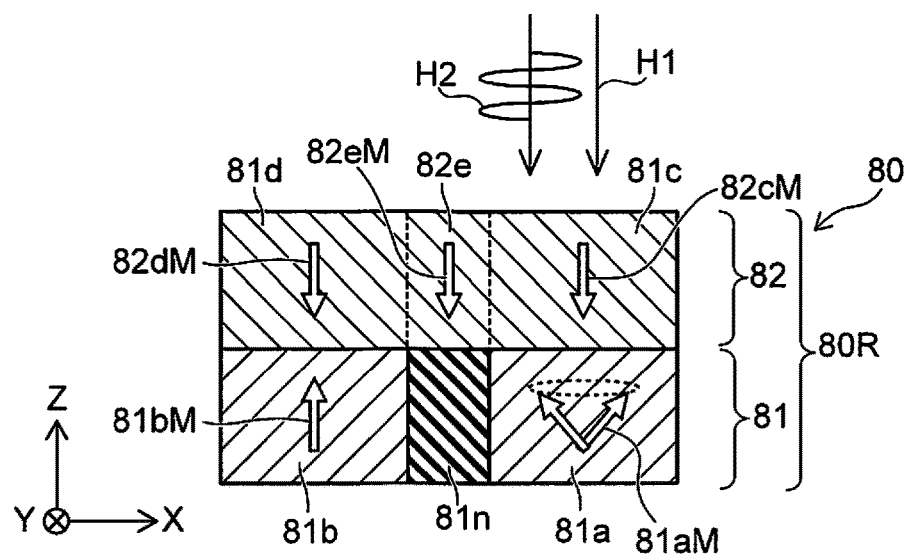
FIG. 3 is a schematic cross-sectional view illustrating the operation of the magnetic recording and reproducing device according to the first embodiment.

FIG. 3 is a schematic cross-sectional view illustrating the operation of the magnetic recording and reproducing device according to the first embodiment. As shown in FIG. 3, the alternating magnetic field H2 that is generated by the alternating magnetic field generator SB of the magnetic head 110 is applied to the magnetic recording medium 80. The alternating magnetic field H2 is a rotating magnetic field. The magnetizations of the magnetic recording medium 80 that have orientations corresponding to the rotation direction of the alternating magnetic field H2 are affected by the alternating magnetic field H2.

For example, the alternating magnetic field H2 that has one rotation direction is applied to the magnetic recording medium 80. The rotation direction of the alternating magnetic field H2 is taken to be the "counterclockwise" direction in the X-Y plane. In such a case, for example, when the magnetization of the magnetic recording medium 80 is "upward," the "upward" magnetization is affected by the alternating magnetic field H2, oscillates, and precesses. Conversely, when the magnetization of the magnetic recording medium 80 is "downward," the "downward" magnetization is substantially not affected by the alternating magnetic field H2 and does not oscillate. Whether or not the magnetization is affected by the alternating magnetic field H2 is determined according to the orientation of the magnetization of the magnetic recording medium 80.

In the example shown in FIG. 3, the first magnetization 81aM of the first magnetic region 81a is "upward." The first magnetization 81aM is affected by the alternating magnetic field H2; and the first magnetization 81aM oscillates and precesses. At this time, the third magnetization 82cM of the third magnetic region 82c overlapping the first magnetic region 81a is "downward" due to the antiferromagnetic coupling with the first magnetic region 81a. Therefore, the third magnetization 82cM is substantially not affected by the alternating magnetic field H2; and the third magnetization 82cM does not change. If the recording magnetic field H1 corresponding to "downward" is applied to the first magnetic region 81a in this state, the first magnetization 81aM of the first magnetic region 81a changes to "downward." In other words, the information is overwritten. At this time, the third magnetization 82cM is changed to "upward" by the antiferromagnetic coupling according to the first magnetization 81aM that is "downward."

Thus, even though the first layer 81 and the second layer 82 are magnetically coupled to each other, the magnetization oscillation substantially does not occur in the second layer 82; and the magnetization oscillation occurs in the first layer 81. As recited above, this is because the magnetization oscillation is a precession rotating in the direction recited above that is "counterclockwise" with respect to the stable direction of the magnetization.

Such a special effect is utilized in the embodiment. In the embodiment, the magnetization oscillation of the first layer 81 is substantially not excited by the magnetization oscillation of the second layer 82. For example, in the microwave assisted magnetic recording, magnetization reversal occurs in the portions of the magnetic recording medium 80 where both the alternating magnetic field H2 and the recording magnetic field H1 are applied. Stable recording is possible locally by locally causing the magnetization oscillation excitation. Stable recording can be performed even in the case where the recording pattern is downscaled. Thereby, a magnetic recording medium and a magnetic recording and reproducing device can be provided in which the recording density can be increased.

Figure 4:
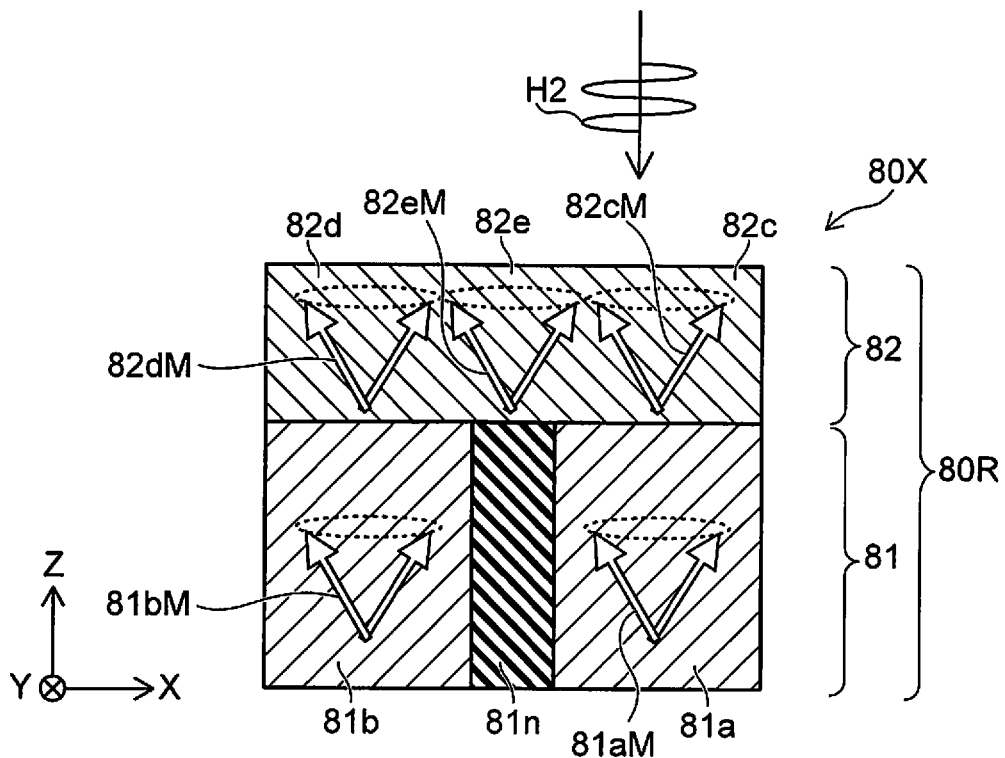
FIG. 4 is a schematic cross-sectional view illustrating an operation of a magnetic recording and reproducing device of a reference example.

FIG. 4 is a schematic cross-sectional view illustrating an operation of a magnetic recording and reproducing device of a reference example.

FIG. 4 illustrates a magnetic recording medium 80X of the reference example. In the reference example, the second layer 82 is ferromagnetically coupled to the first layer 81. The orientation of the third magnetization 82cM of the third magnetic region 82c is the same as the orientation of the first magnetization. 81aM of the first magnetic region 81a. The orientation of the fourth magnetization 82dM of the fourth magnetic region 82d is the same as the orientation of the second magnetization 81bM of the second magnetic region 81b. In the reference example as well, the fifth magnetic region 82e is ferromagnetically coupled to the third magnetic region 82c and the fourth magnetic region 82d.

In the reference example, a magnetization oscillation is generated in the first magnetic region 81a by the alternating magnetic field H2. At this time, because the orientation of the third magnetization 82cM of the third magnetic region 82c is the same as the orientation of the first magnetization 81aM of the first magnetic region 81a, a magnetization oscillation is generated by the alternating magnetic field H2 also in the third magnetic region 82c. Accordingly, magnetization oscillations are generated also in the fifth magnetic region 82e and the fourth magnetic region 82d. As a result, a magnetization oscillation is generated undesirably also in the second magnetic region 81b where the alternating magnetic field H2 is not applied. In other words, the magnetization oscillation due to the alternating magnetic field H2 applied locally propagates to regions where the alternating magnetic field H2 is not applied. Thus, in the reference example, the magnetization oscillation of a grain (the first magnetic region 81a) of a portion of the first layer 81 causes a magnetization oscillation in an adjacent grain (the second magnetic region 81b) via the second layer 82. The magnetization oscillation propagates and undesirably spreads. Downscaling of the recording pattern is difficult.

In the reference example, the efficiency of the magnetization oscillation excitation in the first magnetic region 81a is low because the magnetization oscillation spreads. For example, the effect of the microwave assist weakens. In the reference example, for example, there are cases where the resonance frequency of the first magnetic region 81a changes due to the effect of the ferromagnetic coupling via the second layer 82 and is dependent on the magnetization direction of the adjacent grain. When the resonance frequency of the magnetic recording medium 80 changes, a difference occurs between the resonance frequency and the frequency of the alternating magnetic field H2. Therefore, the efficiency of the microwave assist decreases.

Conversely, in the embodiment as described in reference to FIG. 3, the second layer 82 is antiferromagnetically coupled to the first layer 81. Thereby, the propagation of the magnetization oscillation occurring in a portion of the first layer 81 to other portions of the first layer 81 via the second layer 82 can be suppressed. Thereby, downscaling of the recording pattern is possible. A highly efficient microwave assist effect is obtained because a concentrated magnetization oscillation is excited. For example, the ferromagnetic resonance frequency of the first layer 81 is not affected by the second layer 82 (the coupling layer). Therefore, the effects of the magnetization direction of the adjacent grain on the conditions of the microwave assist are suppressed. Thereby, a stable assist effect can be obtained. Thereby, a magnetic recording medium and a magnetic recording and reproducing device can be provided in which the recording density can be increased.

In the embodiment, the magnetic anisotropy energy of the third magnetic region 82c is smaller than the magnetic anisotropy energy of the first magnetic region 81a. The magnetic anisotropy energy of the fourth magnetic region 82d is smaller than the magnetic anisotropy energy of the second magnetic region 81b. The magnetizations of the first layer 81 are more stable than the magnetizations of the second layer 82. Thereby, after the first magnetization 81aM of the first magnetic region 81a is reversed by the microwave assist, the third magnetization 82cM reverses according to the reversed first magnetization 81aM. After the second magnetization 81bM of the second magnetic region 81b is reversed by the microwave assist, the fourth magnetization 82dM reverses according to the reversed second magnetization 81bM.

In the case where the size relationship of the magnetic anisotropy energy is reversed, for example, there are cases where the first magnetization 81aM of the first magnetic region 81a undesirably reverses further according to the third magnetization 82cM after the first magnetization 81aM is reversed by the microwave assist. As a result, the first magnetization 81aM returns to the original magnetization. Therefore, the desired recording operation is not obtained.

Thus, in the magnetic recording and reproducing device 210 according to the embodiment, the magnetic head 110 includes the magnetic pole 60 and the alternating magnetic field generator SB (referring to FIG. 1A). The first magnetization 81aM of the first magnetic region 81a oscillates when the alternating magnetic field H2 generated from the alternating magnetic field generator SB is applied to the first magnetic region 81a. After the application of the alternating magnetic field H2 to the first magnetic region 81a has ended, the orientation of the third magnetization 82cM of the third magnetic region 82c has a component in the reverse orientation of the orientation of the first magnetization 81aM. Thereby, the microwave assisted recording can be performed stably.

In the embodiment, the stacking order of the first layer 81 and the second layer 82 with respect to the incident direction of the alternating magnetic field H2 is arbitrary.

For example, a strong alternating magnetic field H2 is applied to the first layer 81 in the case where the direction of the alternating magnetic field H2 is the direction from the first layer 81 toward the second layer 82. Therefore, the recording operation (the reversal of the magnetization of the first layer 81) can be performed more efficiently.

In the magnetic recording medium 80 as shown in FIG. 1C, the thickness of the fifth magnetic region 82e is substantially the same as each thickness of the third magnetic region 82c and the fourth magnetic region 82d. For example, the length along the second direction (the Z-axis direction) of the fifth magnetic region 82e is not less than 0.9 times and not more than 1.1 times the length along the second direction of the third magnetic region 82c. For example, the material of the fifth magnetic region 82e is the same as the material of the third magnetic region 82c and the fourth magnetic region 82d. For example, the manufacturing is easy for such a configuration.

Figure 5:
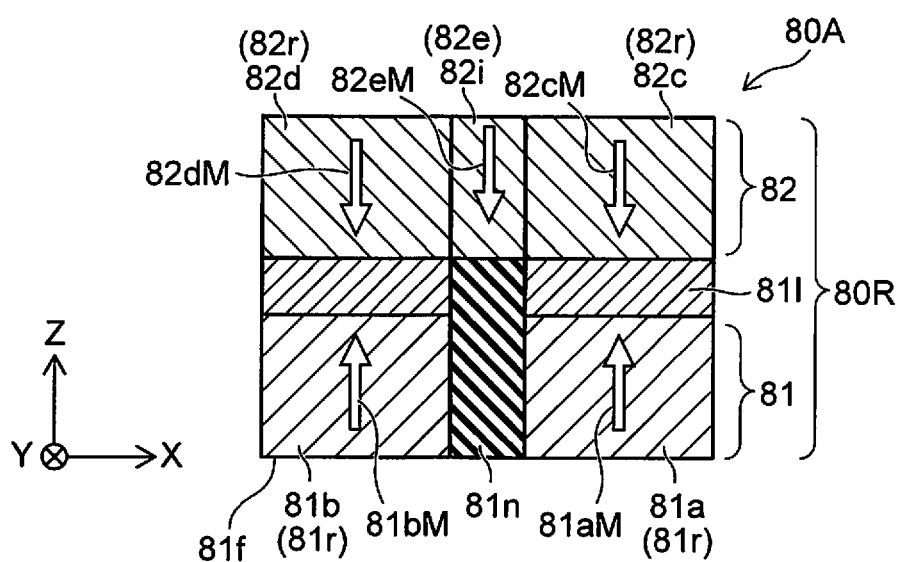
FIG. 5 is a schematic cross-sectional view illustrating another magnetic recording medium according to the first embodiment.

FIG. 5 is a schematic cross-sectional view illustrating another magnetic recording medium according to the first embodiment.

As shown in FIG. 5, the magnetic recording medium 80A further includes an intermediate layer 81I in addition to the first layer 81 and the second layer 82 recited above. Otherwise, the configuration of the magnetic recording medium 80A is similar to the configuration of the magnetic recording medium 80.

The intermediate layer 81I is nonmagnetic. A portion of the intermediate layer 81I is positioned between the first magnetic region 81a and the third magnetic region 82c in the second direction (the Z-axis direction). Another portion of the intermediate layer 81I is positioned between the second magnetic region 81b and the fourth magnetic region 82d in the second direction. In the example, the nonmagnetic region 81n of the first layer 81 is between the other portion of the intermediate layer 81I and the portion of the intermediate layer 81I recited above in the first direction (e.g., the X-axis direction).

The intermediate layer 81I includes, for example, a Ru film. By applying the appropriate material and the appropriate thickness to the intermediate layer 81I, antiferromagnetic coupling can be generated in the first magnetic region 81a and the third magnetic region 82c. Magnetizations that have mutually-reversed orientations between the first layer 81 and the second layer 82 are obtained stably by the intermediate layer 81I. A more stable recording operation is obtained; and the recording density can be increased further.

Figure 6:
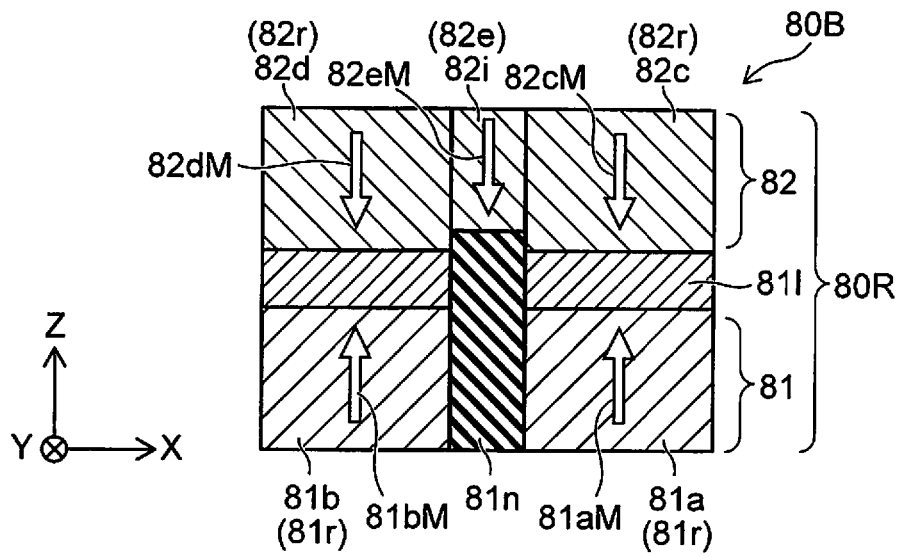
FIG. 6 is a schematic cross-sectional view illustrating another magnetic recording medium according to the first embodiment.

FIG. 6 is a schematic cross-sectional view illustrating another magnetic recording medium according to the first embodiment.

In the magnetic recording medium 80B as shown in FIG. 6, a portion of the nonmagnetic region 81n is positioned between the third magnetic region 82c and the fourth magnetic region 82d in the first direction (the X-axis direction). Otherwise, the configuration of the magnetic recording medium 80B is similar to the configuration of the magnetic recording medium 80A.

In the magnetic recording medium 80B, the fifth magnetic region 82e is between a portion of the third magnetic region 82c and a portion of the fourth magnetic region 82d in the first direction (the X-axis direction). In such a magnetic recording medium 80B as well, the fifth magnetic region 82e can be coupled magnetically to the third magnetic region 82c and the fourth magnetic region 82d. In the magnetic recording medium 80B as well, the recording density can be increased. The magnetic coupling can be adjusted by changing the size of the portion where the fifth magnetic region 82e and the third magnetic region 82c contact and/or the size of the portion where the fifth magnetic region 82e and the fourth magnetic region 82d contact.

Figure 7:
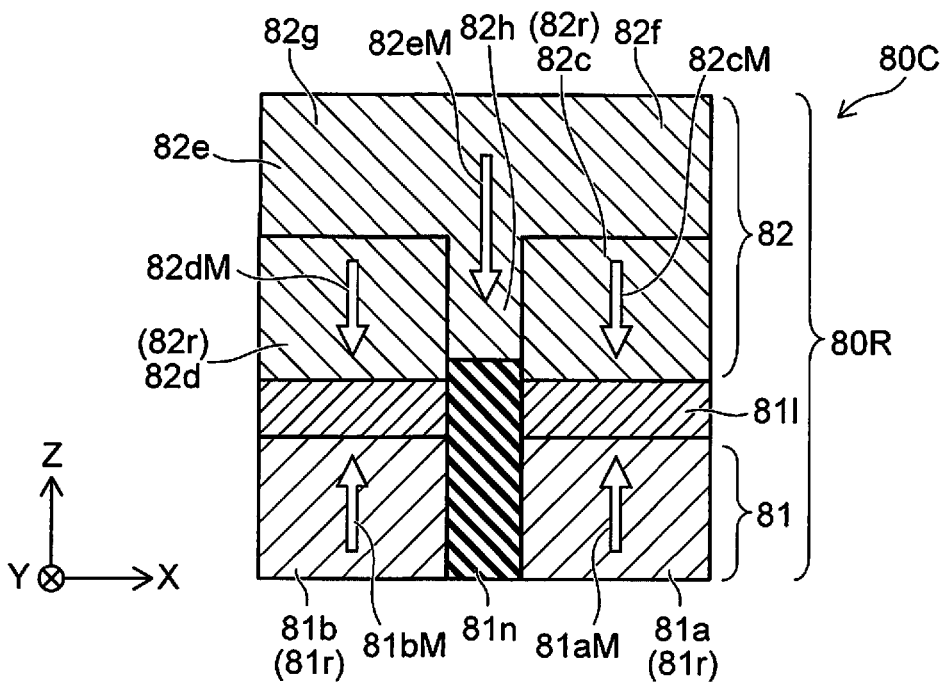
FIG. 7 is a schematic cross-sectional view illustrating another magnetic recording medium according to the first embodiment.

FIG. 7 is a schematic cross-sectional view illustrating another magnetic recording medium according to the first embodiment.

In the magnetic recording medium 80C as shown in FIG. 7, the third magnetic region 82c and the fourth magnetic region 82d are covered with the fifth magnetic region 82e. Otherwise, the configuration of the magnetic recording medium 80C is similar to the configuration of the magnetic recording medium 80B.

In the magnetic recording medium 80C, the fifth magnetic region 82e includes a portion 82f, a portion 82g, and a portion 82h. A portion (the portion 82h) of the fifth magnetic region 82e is positioned between the third magnetic region 82c and the fourth magnetic region 82d in the first direction (the X-axis direction). At least a portion of the third magnetic region 82c is positioned between the first magnetic region 81a and another portion (the portion 82f) of the fifth magnetic region 82e in the second direction (the Z-axis direction). At least a portion of the fourth magnetic region 82d is positioned between the second magnetic region 81b and yet another portion (the portion 82g) of the fifth magnetic region 82e in the second direction (the Z-axis direction). For example, the portion 82f and the portion 82g are continuous with each other. The portion (the portion 82h) of the fifth magnetic region 82e positioned between the third magnetic region 82c and the fourth magnetic region 82d is continuous with the portions 82f and 82g recited above. In the magnetic recording medium 80C as well, the recording density can be increased.

In the magnetic recording medium 80C, because the fifth magnetic region 82e overlaps the third magnetic region 82c and the fourth magnetic region 82d in the second direction (the Z-axis direction), more efficient magnetic field coupling is obtained in these regions. Stable magnetizations are obtained in the second layer 82. The recording density can be increased further.

Figure 8A:
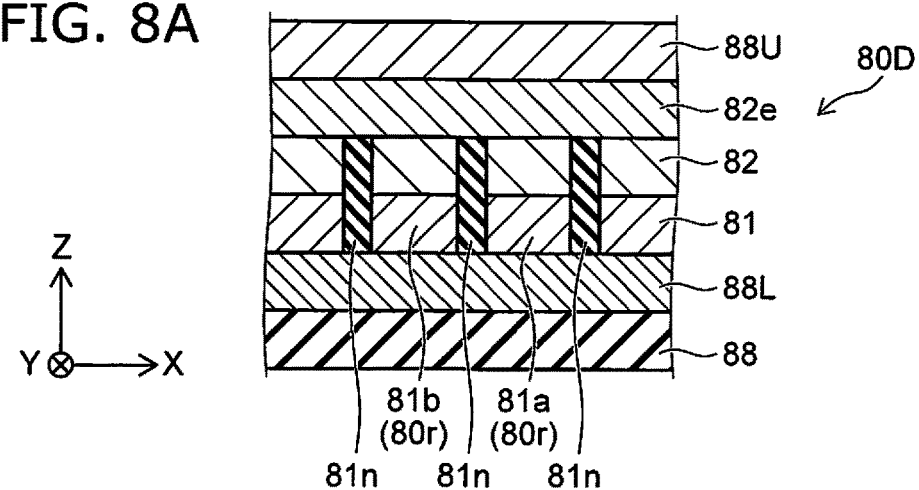
FIG. 8A to FIG. 8C are schematic cross-sectional views illustrating another magnetic recording medium according to the first embodiment.
Figure 8B:
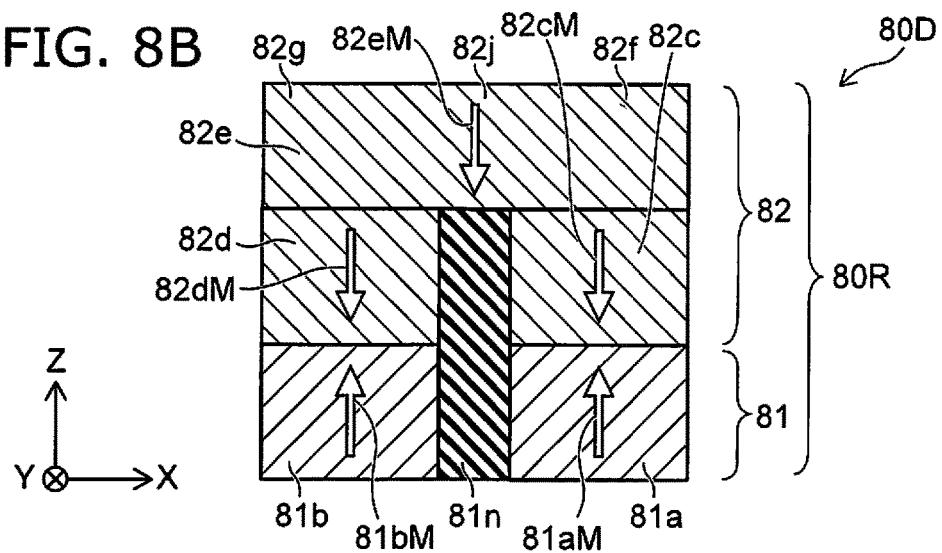
Figure 8C:
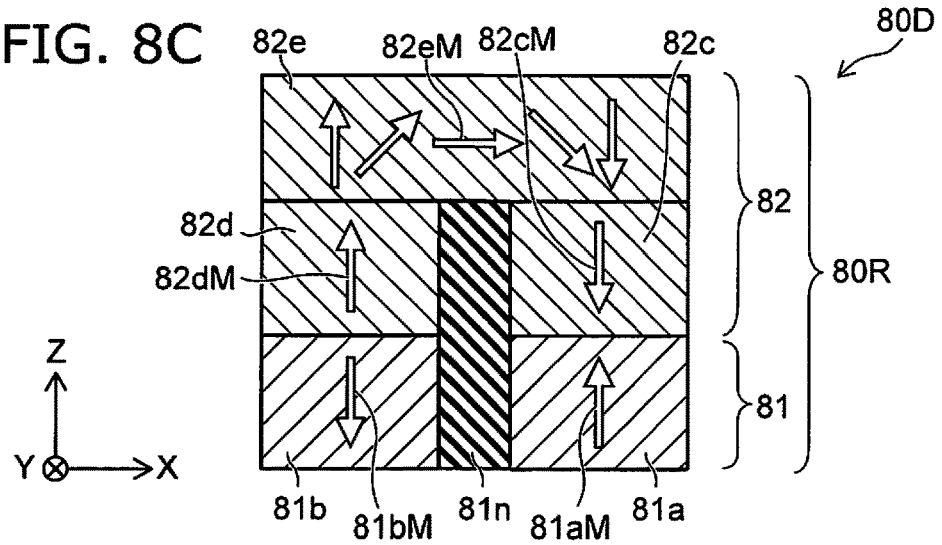

FIG. 8A to FIG. 8C are schematic cross-sectional views illustrating another magnetic recording medium according to the first embodiment.

As shown in FIG. 8A, the magnetic recording medium 80D also includes the first layer 81 and the second layer 82. In the example as well, the first layer 81 includes the first magnetic region 81a, the second magnetic region 81b separated from the first magnetic region 81a in the first direction (the X-axis direction), and the nonmagnetic region 81n provided between the first magnetic region 81a and the second magnetic region 81b.

The second layer 82 includes the third magnetic region 82c, the fourth magnetic region 82d, and the fifth magnetic region 82e. The third magnetic region 82c overlaps the first magnetic region 81a in the second direction (the Z-axis direction) crossing the first direction. The fourth magnetic region 82d overlaps the second magnetic region 81b in the second direction. The fifth magnetic region 82e overlaps the nonmagnetic region 81n in the second direction. In the example, one portion 82j of the fifth magnetic region 82e overlaps the nonmagnetic region 81n in the second direction. The third magnetic region 82c is positioned between the first magnetic region 81a and a portion (the portion 82f) of the fifth magnetic region in the second direction. The fourth magnetic region 82d is positioned between the second magnetic region 81b and another portion (the portion 82g) of the fifth magnetic region 82e in the second direction.

Thus, the configuration of the fifth magnetic region 82e in the magnetic recording medium 80D is different from the configuration of the fifth magnetic region 82e in the magnetic recording medium 80C. Otherwise, for example, the configuration of the magnetic recording medium 80D can be similar to the configuration of the magnetic recording medium 80C.

In other words, as shown in FIG. 8B, in the example as well, the easy magnetization axis of the first magnetic region 81a, the easy magnetization axis of the second magnetic region 81b, the easy magnetization axis of the third magnetic region 82c, the easy magnetization axis of the fourth magnetic region 82d, and the easy magnetization axis of the fifth magnetic region 82e are aligned with the second direction (the Z-axis direction). The orientation of the third magnetization 82cM of the third magnetic region 82c has a reverse component of the orientation of the first magnetization 81aM of the first magnetic region 81a. The orientation of the fourth magnetization 82dM of the fourth magnetic region 82d has a reverse component of the orientation of the second magnetization 81bM of the second magnetic region 81b.

In the example as well, the magnetic anisotropy energy of the third magnetic region 82c is smaller than the magnetic anisotropy energy of the first magnetic region 81a. The magnetic anisotropy energy of the fourth magnetic region 82d is smaller than the magnetic anisotropy energy of the second magnetic region 81b.

In the magnetic recording medium 80D as well, for example, in the microwave assisted recording, the propagation of the magnetization oscillation occurring in a portion of the first layer 81 to other portions of the first layer 81 via the second layer 82 can be suppressed. A highly efficient microwave assist effect is obtained because a concentrated magnetization oscillation is excited. A magnetic recording medium and a magnetic recording and reproducing device can be provided in which the recording density can be increased. As shown in FIG. 8C, in the magnetic recording medium 80D as well, the magnetizations of the adjacent bits are biased toward being in the same direction by the action of the fifth magnetic region 82e. Thereby, the stochastically-occurring reversal of the magnetization of one grain of the multiple grains having the same orientation included in one region 84 (recording bit) due to a disturbance due to heat is suppressed. Thereby, for example, the thermal stability of the recorded information can be improved.

In the example shown in FIG. 8B, the nonmagnetic region 81n is also between the third magnetic region 82c and the fourth magnetic region 82d. For example, such a configuration can be made relatively easily.

In the magnetic recording medium 80D, the third magnetic region 82c and the fourth magnetic region 82d are covered with the fifth magnetic region 82e. Such a configuration can be made relatively easily.

In the magnetic recording medium 80D, the fifth magnetic region 82e opposes the third magnetic region 82c and the fourth magnetic region 82d with a relatively large surface area. Thereby, relatively strong magnetic coupling is obtained.

On the other hand, in the configuration (the magnetic recording medium 80) illustrated in FIG. 1C, the fifth magnetic region 82e is positioned between the third magnetic region 82c and the fourth magnetic region 82d. Therefore, the second layer 82 can be thin. In the magnetic recording medium 80, for example, the fifth magnetic region 82e surrounds multiple magnetic regions (the third magnetic region 82c and the fourth magnetic region 82d). Thereby, magnetic coupling is obtained efficiently between the fifth magnetic region 82e and the multiple magnetic regions (the third magnetic region 82c and the fourth magnetic region 82d).

In the magnetic recording medium 80, 80A, and 80B, the thickness (the length along the Z-axis direction) of the second layer 82 is substantially the same as each thickness of the third magnetic region 82c and the fourth magnetic region 82d. By such a configuration, the second layer 82 can be thin. For example, the entire recording layer 80R can be thin. Thereby, for example, the strength of the recording magnetic field H1 and the alternating magnetic field H2 of the first layer 81 can be maintained to be high. Thereby, a stable recording operation can be performed.

Generally, an interaction due to a leakage magnetic field acts between the multiple grains (e.g., the magnetic regions 81r). There are cases where the leakage magnetic field affects the microwave assist. For example, there are cases where the appropriate conditions of the microwave assist are changed by effects from the leakage magnetic field from the adjacent grain.

At this time, in the embodiment as described above, the magnetizations of the first layer 81 and the magnetizations of the second layer 82 are antiferromagnetically coupled. Therefore, the leakage magnetic fields statically act in the direction of canceling each other. Therefore, for example, the change of the conditions of the microwave assist due to the leakage magnetic fields from the adjacent grains can be suppressed. A more stable microwave assist effect is obtained.

For example, the leakage magnetic field is low when the magnetic volume of the magnetization (the product of the saturation magnetization and the thickness) of the first layer 81 per unit surface area is the same as the magnetic volume of the magnetization of the second layer 82 (including the fifth magnetic region 82e) per unit surface area. In such a case, for example, the leakage magnetic field is a minimum.

From this perspective, the magnetic volume of the second layer 82 per unit surface area may be not less than 0.9 times and not more than 1.1 times the magnetic volume of the first layer 81 per unit surface area. In such a case, the leakage magnetic field can be small. The unit surface area recited above is the unit surface area in a plane (e.g., the X-Y plane) crossing the second direction (the Z-axis direction).

On the other hand, when the information that is recorded in the magnetic recording medium is reproduced, there are cases where the leakage magnetic field from the magnetic recording medium is sensed. In such a case, it is favorable for the leakage magnetic field to have an appropriate size. For example, the magnitude of the leakage magnetic field emitted from the magnetic recording medium may be large on the magnetic head 110 side. Thereby, the leakage magnetic field can be sensed efficiently by a reproducing part (e.g., a MR element) included in the magnetic head 110.

For example, in the embodiment, the magnetic recording medium (e.g., the magnetic recording medium 80) includes the base body 88 (referring to FIG. 1B) in addition to the first layer 81 and the second layer 82 recited above. In the example shown in FIG. 1A, the second layer 82 is positioned between the base body 88 and the first layer 81. Compared to the first layer 81, the second layer 82 is proximal to the magnetic head 110. In such a case, it is favorable for the magnetic volume of the first layer 81 per unit surface area (the unit surface area in a plane crossing the Z-axis direction) to be not less than 1.1 times and not more than 2 times the magnetic volume of the second layer 82 per unit surface area. The appropriate leakage magnetic field is obtained; and the reproducing can be more stable.

Conversely, the first layer 81 may be positioned between the base body 88 and the second layer 82. In such a case, it is favorable for the magnetic volume of the first layer 81 per unit surface area (the unit surface area in a plane crossing the Z-axis direction) to be not less than 0.5 times and not more than 0.9 times the magnetic volume of the second layer 82 per unit surface area. The appropriate leakage magnetic field is obtained; and the reproducing can be more stable.

On the other hand, there is a method for sensing the magnetization direction by sensing the ferromagnetic resonance frequency of the recording layer 80R. In this method, the static leakage magnetic field is not used to sense the magnetization direction. In such a case, the leakage magnetic field may be set to be small. For example, the magnetic volume of the second layer 82 per unit surface area may be not less than 0.9 times and not more than 1.1 times the magnetic volume of the first layer 81 per unit surface area.

Figure 9:
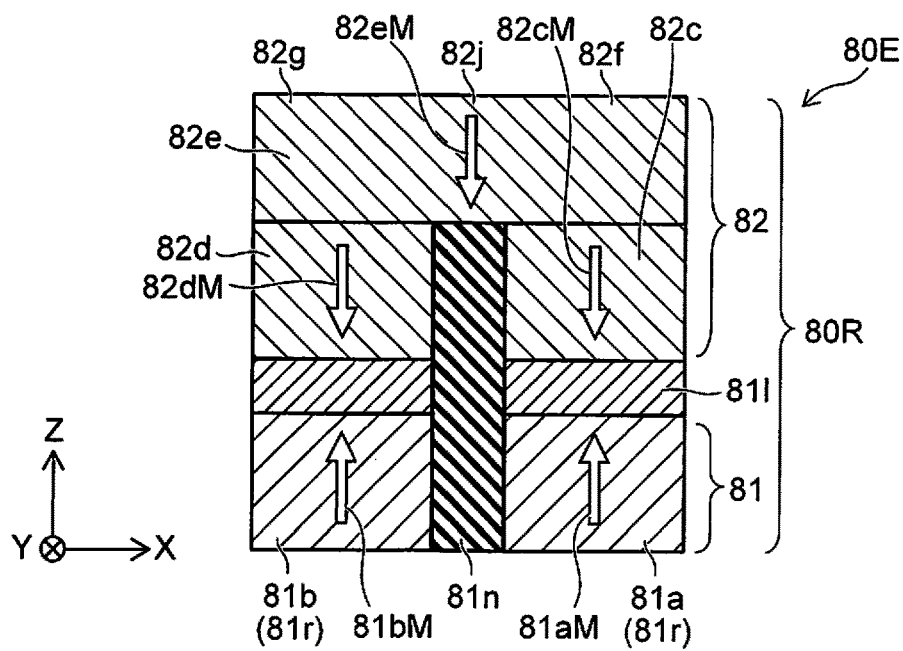
FIG. 9 is a schematic cross-sectional view illustrating another magnetic recording medium according to the first embodiment.

FIG. 9 is a schematic cross-sectional view illustrating another magnetic recording medium according to the first embodiment.

As shown in FIG. 9, the magnetic recording medium 80E further includes the intermediate layer 81I in addition to the first layer 81 and the second layer 82 recited above. Otherwise, the configuration of the magnetic recording medium 80E is similar to the configuration of the magnetic recording medium 80D.

The intermediate layer 81I is nonmagnetic. A portion of the intermediate layer 81I is positioned between the first magnetic region 81a and the third magnetic region 82c in the second direction (the Z-axis direction). Another portion of the intermediate layer 81I is positioned between the second magnetic region 81b and the fourth magnetic region 82d in the second direction. In the example, the nonmagnetic region 81n of the first layer 81 is between the portion of the intermediate layer 81I and the other portion of the intermediate layer 81I recited above in the first direction (e.g., the X-axis direction). Magnetizations that have mutually-reversed orientations between the first layer 81 and the second layer 82 are obtained stably by the intermediate layer 81I. A more stable recording operation is obtained; and the recording density can be increased further.

Second Embodiment

Figure 10:
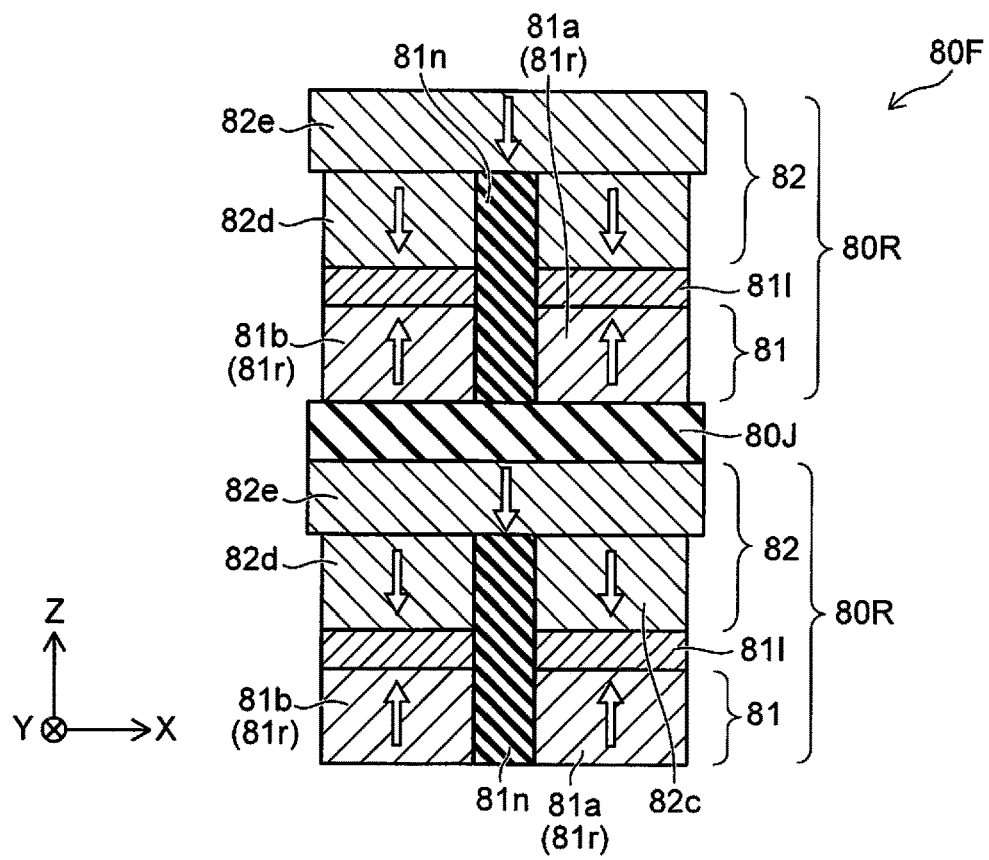
FIG. 10 is a schematic cross-sectional view illustrating a magnetic recording medium according to a second embodiment.

FIG. 10 is a schematic cross-sectional view illustrating a magnetic recording medium according to a second embodiment.

As shown in FIG. 10, the magnetic recording medium 80F according to the second embodiment includes multiple recording layers 80R. The multiple recording layers 80R are arranged in the second direction (the Z-axis direction). The multiple recording layers 80R each include the first layer 81 and the second layer 82. In the example, the magnetic recording medium 80F further includes a third layer 803. The third layer 803 is provided between the multiple recording layers 80R.

For example, the third layer 803 breaks or weakens the magnetic coupling between the multiple recording layers 80R. The third layer 803 is, for example, a decoupling layer. The third layer 803 includes, for example, at least one selected from the group consisting of silicon oxide and Ta. The third layer 803 may include at least one selected from the group consisting of Ru, MgO, and Cu. The film of these materials functions as, for example, an orientation control layer. Grains that have good crystallinity are obtained.

In the magnetic recording medium 80F, for example, the ferromagnetic resonance frequency of the multiple magnetic regions 81r included in one of the multiple recording layers may be different from the ferromagnetic resonance frequency of the multiple magnetic regions 81r included in another one of the multiple recording layers 80R. For example, the ferromagnetic resonance frequency of the first magnetic region 81a included in one of the multiple recording layers 80R may be different from the ferromagnetic resonance frequency of the first magnetic region 81a included in another one of the multiple recording layers 80R. For example, the recording density can be increased by recording in the multiple recording layers 80R. For example, selective recording to one of the multiple recording layers 80R can be performed.

For example, in the case where the alternating magnetic field H2 of the frequency exciting the magnetization oscillation of the first layer 81 included in one recording layer 80R is applied, the recording is performed in the one recording layer 80R; and the recording is not performed in the other recording layer 80R. Recording in which the layer is selected can be performed.

In the example shown in FIG. 10, one of the multiple recording layers 80R has the configuration of the magnetic recording medium 80E. In the embodiment, one of the multiple recording layers 80R may have any configuration or any modification of a configuration according to the first embodiment.

Examples of the materials included in the magnetic recording media according to the first and second embodiments will now be described.

In the first layer 81 of the embodiment, the multiple magnetic regions 81r (e.g., the first magnetic region 81a, the second magnetic region 81b, etc.) include, for example, at least one selected from the group consisting of a Cocr-based alloy, an FePt-based alloy, a CoPt-based alloy, a Co/Pt stacked film, a Co/Pt stacked film, and a RE-TM alloy (rare earth-iron group alloy).

The nonmagnetic region 81n includes, for example, at least one selected from the group consisting of silicon oxide and carbon.

The second layer 82 includes, for example, at least one selected from the group consisting of a CoCr-based alloy, an FePt-based alloy, a CoPt-based alloy, a Co/Pt stacked film, a Co/Pt stacked film, and a RE-TM alloy (rare earth-iron group alloy).

In the second layer 82, for example, the material of the third magnetic region 82c is the same as the material of the fourth magnetic region 82d. For example, the material of the fifth magnetic region 82e may be the same as or different from the material of the third magnetic region 82c.

For example, the material of at least a portion of the second layer 82 is different from the material of the multiple magnetic regions 81r included in the first layer 81. In the case where the second layer 82 includes the same element group as the element group included in the multiple magnetic regions 81r, the composition of the second layer 82 is different from the composition of the multiple magnetic regions 81r.

In the embodiment, the strength of the antiferromagnetic coupling between the first layer 81 and the second layer 82 is adjusted appropriately. The strength of the magnetic anisotropy of the multiple magnetic regions 81r (e.g., the first magnetic region 81a, etc.) of the first layer 81 and the strength of the magnetic anisotropy of the magnetic regions (e.g., the third magnetic region 82c, etc.) of the second layer 82 are adjusted appropriately. Thereby, for example, in the recording operation, the orientation of the magnetization (e.g., the third magnetization 82cM) of the second layer 82 spontaneously is the reverse of the orientation of the magnetization (e.g., the first magnetization 81aM) of the first layer 81; and the reversal of the magnetization (e.g., the first magnetization 81aM) of the first layer 81 due to the effects of the antiferromagnetic coupling is suppressed.

For example, the coupling equivalent magnetic field that acts on the second layer 82 is set to be larger than the coercivity of the magnetization (e.g., the third magnetization 82cM) of the second layer 82 at the operating temperature. For example, the coupling equivalent magnetic field that acts on the first layer 81 is set to be smaller than the coercivity of the magnetization (e.g., the first magnetization 81aM) of the first layer 81 at the operating temperature. Thereby, the conditions recited above are obtained.

Considering the action of the magnetic field applied to the magnetic recording medium 80 from the magnetic head 110 in the recording operation, etc., the orientation of the magnetization (e.g., the third magnetization 82cM) of the second layer 82 can be spontaneously caused to be the reverse of the orientation of the magnetization (e.g., the first magnetization 81aM) of the first layer 81 also for conditions different from those recited above. Such operating conditions are applicable to the embodiment.

In the embodiment, the base body 88 includes, for example, glass or aluminum.

The lower layer 88L includes a soft magnetic layer (a soft under layer). The soft magnetic layer includes, for example, at least one selected from the group consisting of FeAlSi, CoZrNb, CoZrTa, CoFeB, and CoNi. The lower layer 88L may include multiple soft magnetic layers. An insertion layer (e.g., a Ru film, etc.) may be provided between two soft magnetic layers. Thereby, the two soft magnetic layers can be antiferromagnetically coupled. In such a case, the leakage magnetic field from the soft magnetic layers is suppressed. For example, the characteristics as the magnetic recording medium improve. The lower layer 88L may further include another layer (e.g., a Ru film, a MgO film, a Cr film, etc.) in addition to the soft magnetic layer. The other layer functions as, for example, an orientation control layer. For example, the crystallinity of the magnetic layers (e.g., the multiple magnetic regions 81r, etc.) can be controlled by the orientation control layer. For example, the formation of grains in the first layer 81 can be controlled by the orientation control layer.

The upper layer 88U functions as, for example, a protective layer. For example, the upper layer 88U protects the recording layer 80R from mechanical shocks and chemical effects such as oxidization, etc. The upper layer 88U includes, for example, carbon.

An example of the magnetic recording and reproducing devices according to the first and second embodiments will now be described.

Figure 11:
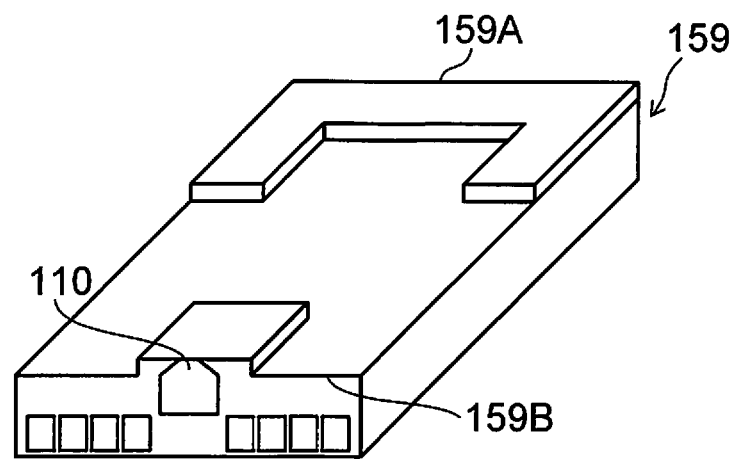
FIG. 11 is a schematic perspective view illustrating a portion of the magnetic recording and reproducing device according to the embodiment.

FIG. 11 is a schematic perspective view illustrating a portion of the magnetic recording and reproducing device according to the embodiment.

FIG. 11 illustrates a head slider.

The head slider 159 is provided in the magnetic head 110. The head slider 159 includes, for example, $Al_2O_3$/TiC, etc. The head slider 159 moves relative to the magnetic recording medium while flying over or contacting the magnetic recording medium.

The head slider 159 has, for example, an air inflow side 159A and an air outflow side 159B. The magnetic head 110 is disposed at the side surface of the air outflow side 159B of the head slider 159 or the like. Thereby, the magnetic head 110 moves relative to the magnetic recording medium while flying over or contacting the magnetic recording medium.

Figure 12:
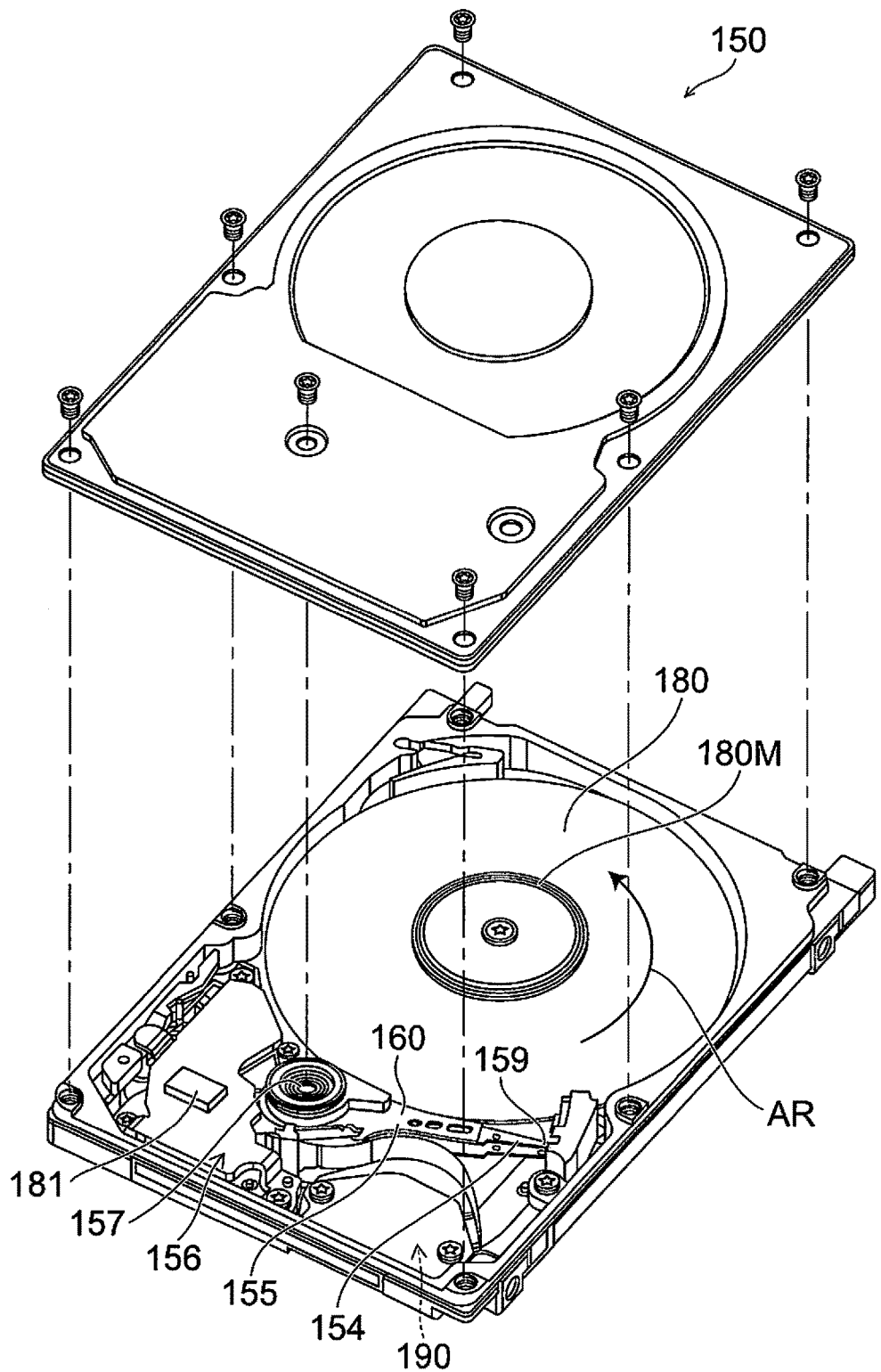
FIG. 12 is a schematic perspective view illustrating the magnetic recording and reproducing device according to the embodiment.

FIG. 12 is a schematic perspective view illustrating the magnetic recording and reproducing device according to the embodiment.

Figure 13A:
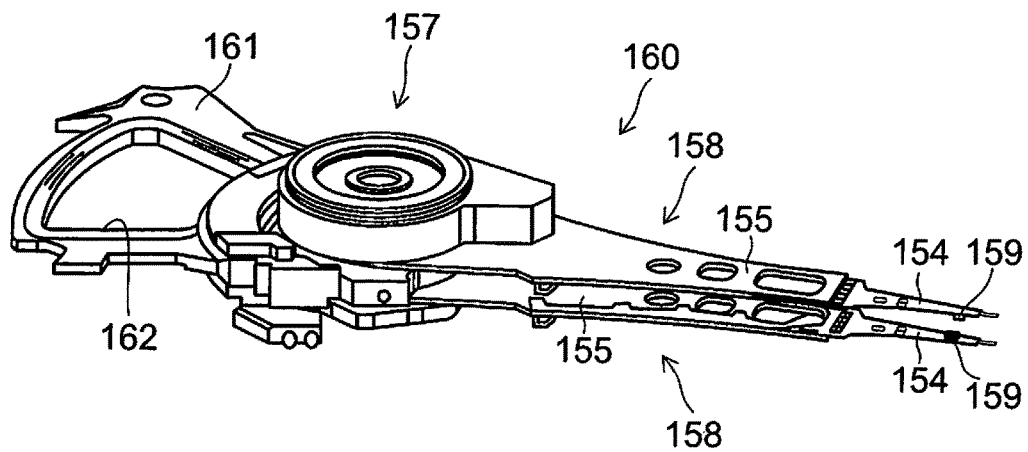
FIG. 13A and FIG. 13B are schematic perspective views illustrating a portion of the magnetic recording and reproducing device according to the embodiment.
Figure 13B:
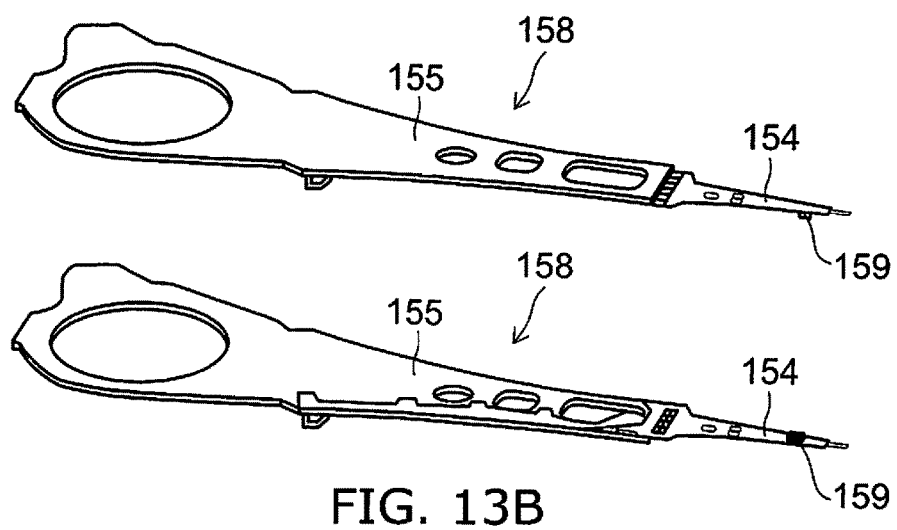

FIG. 13A and FIG. 13B are schematic perspective views illustrating a portion of the magnetic recording and reproducing device according to the embodiment.

As shown in FIG. 12, a rotary actuator is used in the magnetic recording and reproducing device 150 according to the embodiment. A recording medium disk 180 is mounted to a spindle motor 180M. The recording medium disk 180 is rotated in the direction of arrow AR by the spindle motor 180M. The spindle motor 180M responds to a control signal from a drive device controller. The magnetic recording and reproducing device 150 according to the embodiment may include multiple recording medium disks 180. The magnetic recording and reproducing device 150 may include a recording medium 181. The recording medium 181 is, for example, a SSD (Solid State Drive). The recording medium 181 includes, for example, nonvolatile memory such as flash memory, etc. For example, the magnetic recording and reproducing device 150 may be a hybrid HDD (Hard Disk Drive).

The head slider 159 records and reproduces the information recorded in the recording medium disk 180. The head slider 159 is provided at the tip of a suspension 154 having a thin-film configuration. The magnetic head according to the embodiment is provided at the tip vicinity of the head slider 159.

When the recording medium disk 180 rotates, the downward pressure due to the suspension 154 and the pressure generated by the medium-opposing surface (the ABS) of the head slider 159 are balanced. The distance between the medium-opposing surface of the head slider 159 and the surface of the recording medium disk 180 becomes a prescribed fly height. In the embodiment, the head slider 159 may contact the recording medium disk 180. For example, contact-sliding is applicable.

The suspension 154 is connected to one end of an arm 155 (e.g., an actuator arm). The arm 155 includes, for example, a bobbin part, etc. The bobbin part holds a drive coil. A voice coil motor 156 is provided at the other end of the arm 155. The voice coil motor 156 is one type of linear motor. The voice coil motor 156 includes, for example, the drive coil and a magnetic circuit. The drive coil is wound onto the bobbin part of the arm 155. The magnetic circuit includes a permanent magnet and an opposing yoke. The drive coil is provided between the permanent magnet and the opposing yoke. The suspension 154 has one end and another end. The magnetic head is provided at the one end of the suspension 154. The arm 155 is connected to the other end of the suspension 154.

The arm 155 is held by ball bearings. The ball bearings are provided at two locations above and below a bearing part 157. The arm 155 can rotate and slide due to the voice coil motor 156. The magnetic head is movable to any position of the recording medium disk 180.

FIG. 13A illustrates the configuration of a portion of the magnetic recording and reproducing device and is an enlarged perspective view of a head stack assembly 160.

FIG. 13B is a perspective view illustrating a magnetic head assembly (a head gimbal assembly (HGA)) 158 that is a portion of the head stack assembly 160.

As shown in FIG. 13A, the head stack assembly 160 includes the bearing part 157, the head gimbal assembly 158, and a support frame 161. The head gimbal assembly 158 extends from the bearing part 157. The support frame 161 extends from the bearing part 157. The direction in which the support frame 161 extends is the reverse of the direction in which the head gimbal assembly 158 extends. The support frame 161 supports a coil 162 of the voice coil motor 156.

As shown in FIG. 13B, the head gimbal assembly 158 includes the arm 155 extending from the bearing part 157, and the suspension 154 extending from the arm 155.

The head slider 159 is provided at the tip of the suspension 154. The magnetic head according to the embodiment is provided at the head slider 159.

The magnetic head assembly (the head gimbal assembly) 158 according to the embodiment includes the magnetic head according to the embodiment, the head slider 159 on which the magnetic head is provided, the suspension 154, and the arm 155. The head slider 159 is provided at one end of the suspension 154. The arm 155 is connected to the other end of the suspension 154.

The suspension 154 includes, for example, lead wires (not illustrated) that are for recording and reproducing signals. The suspension 154 may include, for example, lead wires (not illustrated) for a heater that adjusts the fly height. The suspension 154 may include, for example, lead wires (not illustrated) for a spin torque oscillator, etc. These lead wires are electrically connected to multiple electrodes provided in the magnetic head.

A signal processor 190 is provided in the magnetic recording and reproducing device 150. The signal processor 190 records and reproduces the signals to and from the magnetic recording medium by using the magnetic head. In the signal processor 190, for example, the input/output lines of the signal processor 190 are electrically connected to the magnetic head by being connected to electrode pads of the head gimbal assembly 158.

The magnetic recording and reproducing device 150 according to the embodiment includes a magnetic recording medium, the magnetic head according to the embodiment, a movable part, a position controller, and a signal processor. The movable part causes the magnetic recording medium and the magnetic head to separate or causes the magnetic recording medium and the magnetic head to be movable relative to each other in a state of contact. The position controller aligns the magnetic head at a prescribed recording position of the magnetic recording medium. The signal processor records and reproduces the signals to and from the magnetic recording medium by using the magnetic head.

For example, the recording medium disk 180 is used as the magnetic recording medium recited above. The movable part recited above includes, for example, the head slider 159. The position controller recited above includes, for example, the head gimbal assembly 158.

The magnetic recording and reproducing, device 150 according to the embodiment includes a magnetic recording medium, the magnetic head assembly according to the embodiment, and a signal processor that records and reproduces the signals to and from the magnetic recording medium by using a magnetic head provided in the magnetic head assembly.

According to the embodiments, a magnetic recording medium and a magnetic recording and reproducing device can be provided in which the recording density can be increased.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in magnetic recording mediums or magnetic recording and reproducing devices such as layers, magnetic regions, intermediate layers, magnetic heads, magnetic poles, alternating magnetic field generators, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all magnetic recording mediums and, and magnetic recording and reproducing devices practicable by an appropriate design modification by one skilled in the art based on the semiconductor memory devices, the magnetic recording mediums, and the magnetic recording and reproducing devices described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A magnetic recording medium, comprising:
    a first layer including a first magnetic region, a second magnetic region, and a nonmagnetic region provided between the first magnetic region and the second magnetic region, a direction from the second magnetic region toward the first magnetic region being along a first direction; and
    a second layer including a third magnetic region, a fourth magnetic region, and a fifth magnetic region, at least a portion of the fifth magnetic region being provided between the third magnetic region and the fourth magnetic region, the third magnetic region overlapping the first magnetic region in a second direction crossing the first direction, the fourth magnetic region overlapping the second magnetic region in the second direction, the fifth magnetic region overlapping the nonmagnetic region in the second direction,
    an easy magnetization axis of each of the first to fifth magnetic regions being aligned with the second direction,
    an orientation of a third magnetization of the third magnetic region having a reverse component of an orientation of a first magnetization of the first magnetic region,
    an orientation of a fourth magnetization of the fourth magnetic region having a reverse component of an orientation of a second magnetization of the second magnetic region,
    a magnetic anisotropy energy of the third magnetic region being smaller than a magnetic anisotropy energy of the first magnetic region,
    a magnetic anisotropy energy of the fourth magnetic region being smaller than a magnetic anisotropy energy of the second magnetic region.

2. The medium according to claim 1, wherein
    at least a portion of the third magnetic region is positioned between the first magnetic region and another portion of the fifth magnetic region in the second direction, and
    at least a portion of the fourth magnetic region is positioned between the second magnetic region and yet another portion of the fifth magnetic region in the second direction.

3. The medium according to claim 1, wherein a portion of the nonmagnetic region is positioned between the third magnetic region and the fourth magnetic region in the first direction.

4. The medium according to claim 1, wherein the fifth magnetic region is magnetically coupled to the third magnetic region and the fourth magnetic region.

5. The medium according to claim 1, further comprising an intermediate layer,
    the intermediate layer being nonmagnetic, a portion of the intermediate layer being positioned between the first magnetic region and the third magnetic region in the second direction, another portion of the intermediate layer being positioned between the second magnetic region and the fourth magnetic region in the second direction.

6. The medium according to claim 1, wherein a length along the second direction of the fifth magnetic region is not less than 0.9 times and not more than 1.1 times a length along the second direction of the third magnetic region.

7. The medium according to claim 1, wherein a magnetic volume of the second layer per unit surface area in a plane crossing the second direction is not less than 0.9 times and not more than 1.1 times a magnetic volume of the first layer per unit surface area.

8. The medium according to claim 1, further comprising a base body, the first layer being positioned between the base body and the second layer, a magnetic volume of the first layer per unit surface area in a plane crossing the second direction being not less than 0.5 times and not more than 0.9 times a magnetic volume of the second layer per unit surface area.

9. The medium according to claim 1, further comprising a base body, the second layer being positioned between the base body and the first layer, a magnetic volume of the first layer per unit surface area in a plane crossing the second direction being not less than 1.1 times and not more than 2 times a magnetic volume of the second layer per unit surface area.

10. The medium according to claim 1, comprising a plurality of recording layers arranged in the second direction, each of the recording layers including the first layer and the second layer.

11. The medium according to claim 10, wherein a ferromagnetic resonance frequency of the first magnetic region included in one of the recording layers is different from a ferromagnetic resonance frequency of the first magnetic region included in another one of the recording layers.

12. A magnetic recording and reproducing device, comprising:

the magnetic recording medium according to claim 1; and
a magnetic head, the magnetic head including a magnetic pole and an alternating magnetic field generator, the first magnetization of the first magnetic region oscillating when an alternating magnetic field generated from the alternating magnetic field generator is applied to the first magnetic region.

13. The device according to claim 12, wherein an orientation of a third magnetization of the third magnetic region has a component in the reverse orientation of an orientation of the first magnetization after the application of the alternating magnetic field to the first magnetic region has ended.

14. A magnetic recording medium, comprising:

a first layer including a first magnetic region, a second magnetic region, and a nonmagnetic region provided between the first magnetic region and the second magnetic region, a direction from the second magnetic region toward the first Magnetic region being along a first direction; and a second layer including a third magnetic region, a fourth magnetic region, and a fifth magnetic region, the third magnetic region overlapping the first magnetic region in a second direction crossing the first direction, the fourth magnetic region overlapping the second magnetic region in the second direction, the fifth magnetic region overlapping the nonmagnetic region in the second direction, the third magnetic region being positioned between the first magnetic region and a portion of the fifth magnetic region in the second direction, the fourth magnetic region being positioned between the second magnetic region and another portion of the fifth magnetic region in the second direction, an easy magnetization axis of each of the first to fifth magnetic regions being aligned with the second direction, an orientation of a third magnetization of the third magnetic region having a reverse component of an orientation of a first magnetization of the first magnetic region, an orientation of a fourth magnetization of the fourth magnetic region having a reverse component of an orientation of a second magnetization of the second magnetic region, a magnetic anisotropy energy of the third magnetic region being smaller than a magnetic anisotropy energy of the first magnetic region, a magnetic anisotropy energy of the fourth magnetic region being smaller than a magnetic anisotropy energy of the second magnetic region.

* * * * *